United States Patent
Chaperon et al.

(10) Patent No.: US 8,126,603 B2
(45) Date of Patent: Feb. 28, 2012

(54) REDUCTION OF SHIFT OCCURRENCES ASSOCIATED WITH HYBRID VEHICLES

(75) Inventors: Neal A Chaperon, Milford, MI (US); Goro Tamai, West Bloomfield, MI (US); Jeffrey R. Aldrich, Davison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 391 days.

(21) Appl. No.: 12/474,706

(22) Filed: May 29, 2009

(65) Prior Publication Data

US 2010/0305824 A1 Dec. 2, 2010

(51) Int. Cl.
*B60L 9/00* (2006.01)

(52) U.S. Cl. .............................................. 701/22; 701/1

(58) Field of Classification Search ...................... 701/22, 701/51, 66, 1
See application file for complete search history.

(56) References Cited

U.S. PATENT DOCUMENTS 6,370,464 B1 * 4/2002 Herbster et al. ................ 701/55
(Continued)

*Primary Examiner* — Hussein A. Elchanti
(74) *Attorney, Agent, or Firm* — Quinn Law Group, PLLC

(57) ABSTRACT

A method for controlling operating mode of a vehicle having the electrically variable transmission includes requesting a shift in the operating mode of the transmission and determining if the shift in operating mode is desirable given vehicle conditions. If a shift is desirable then the system compares a timer value with a predetermined time value. The system instructs a shift in the operating mode of the transmission when the timer value is greater than or equal to the predetermined time value and instructs no shift in operating mode of the transmission when the timer value is less than the predetermined time value.

13 Claims, 3 Drawing Sheets

U.S. PATENT DOCUMENTS

| | | | |
|---|---|---|---|
| 6,793,027 B1 * | 9/2004 | Yamada et al. | 180/65.1 |
| 6,823,954 B2 * | 11/2004 | Shimabukuro et al. | 180/65.25 |
| 7,223,200 B2 * | 5/2007 | Kojima et al. | 477/3 |
| 7,282,008 B2 * | 10/2007 | Oshidari | 477/4 |
| 2008/0119975 A1 * | 5/2008 | Yamazaki et al. | 701/22 |
| 2009/0248265 A1 * | 10/2009 | Tabata et al. | 701/59 |

\* cited by examiner

REDUCTION OF SHIFT OCCURRENCES ASSOCIATED WITH HYBRID VEHICLES

TECHNICAL FIELD

The present invention relates, generally, to a vehicle having an electrically variable transmission, and more specifically, to a system for controlling the electrically variable transmission.

BACKGROUND OF THE INVENTION

Vehicles with electrically variable transmissions are frequently driven by the transmission including the associated battery and motor/generators. Electric hybrid vehicles offer the potential for significant fuel economy improvements over their conventional counterparts. The hybrid systems use electric motors to drive the vehicle under certain conditions, and the vehicle engine is shut off to save fuel.

Under certain driving conditions the electric motors do not have the capacity to provide the power required by the vehicle. When the capacity of the electric motors is reached, the vehicle engine is started and the engine is used to drive the vehicle. However, a vehicle operating near the threshold of requiring power from the engine or able to be powered by the electrically variable transmission alone may cause the vehicle to frequently shift in and out of electrically variable mode.

Additionally, to enhance performance and fuel economy of the vehicle, the electrically variable transmission is operated in a first mode when the vehicle is in electric vehicle mode and in a second mode when the engine is operating. The first mode and the second mode may include differing commands for gear shift timing and other transmission operations. Continually switching the transmission between the first operating mode and the second operating mode not only reduces fuel economy but may also affect the smoothness of the vehicle ride.

SUMMARY OF THE INVENTION

A system for reducing the frequency of shift occurrences of an operating mode for an electrically variable transmission is provided. A method for controlling the operating mode of a vehicle having the electrically variable transmission includes requesting a shift in the operating mode of the transmission and determining if the shift in operating mode is desirable given vehicle conditions. If a shift is desirable then the system compares a timer value with a predetermined time value. The system instructs a shift in the operating mode of the transmission when the timer value is greater than or equal to the predetermined time value and instructs no shift in operating mode of the transmission when the timer value is less than the predetermined time value.

The system may also compare a timer vehicle speed with a current vehicle speed and instruct a shift in the operating mode of the transmission when the timer value is less than the predetermined time value and the current vehicle speed is outside a predetermined speed range from the timer vehicle speed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
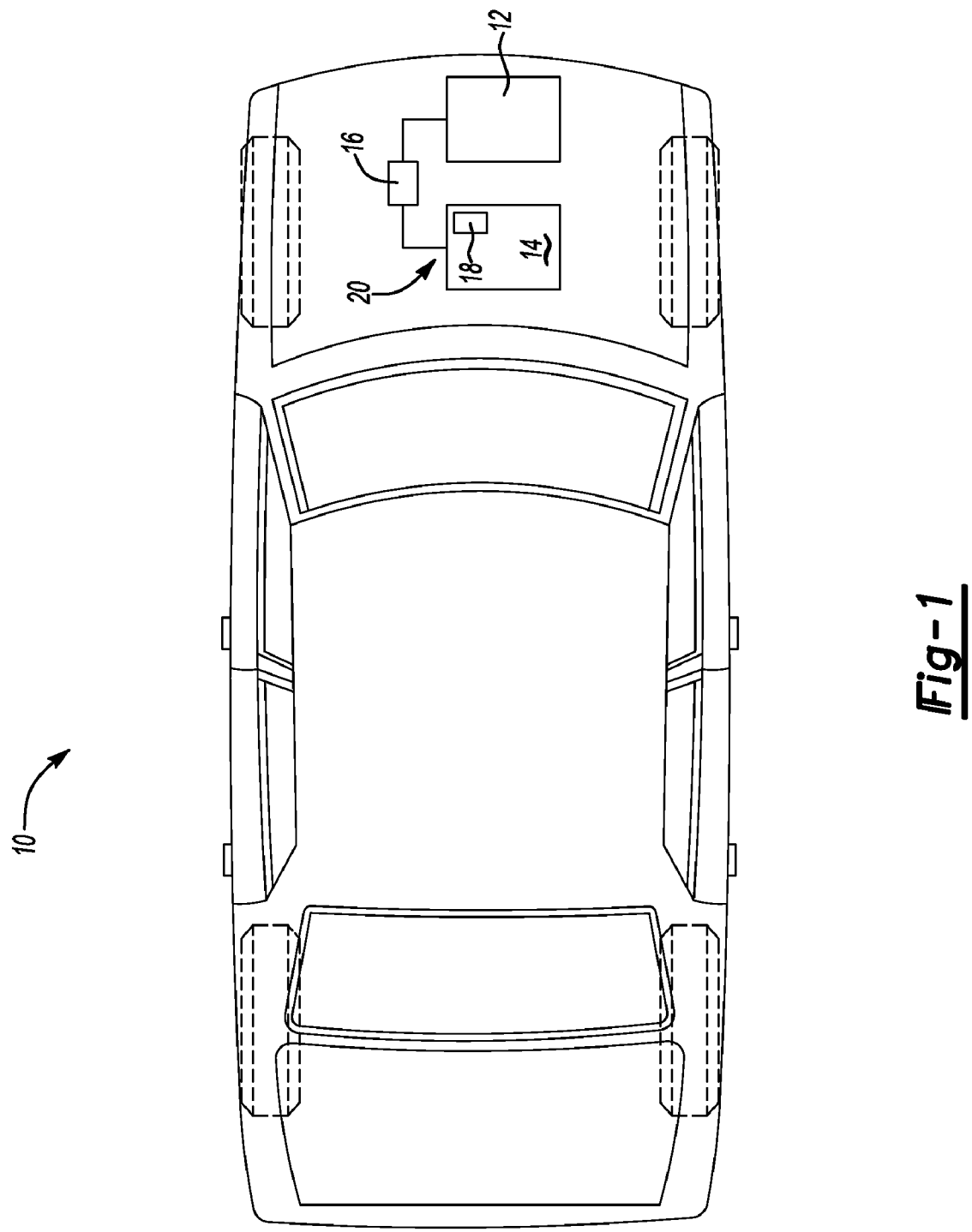
FIG. 1 is a schematic illustration of a vehicle having an electrically variable transmission with an operating mode control system including a shift reduction control.

Referring to the Figures, wherein like reference numbers refer to the same or similar components throughout the several views, FIG. 1 schematically illustrates a vehicle 10 including an engine 12 and an electrically variable transmission 14. An electronic control unit (ECU) 16 is connected to the engine 12 and the transmission 14 for controlling operation of the engine 12 and the transmission 14.

The transmission 14 includes at least one motor/generator 18. An operating mode control system 20 includes the transmission 14, the ECU 16, the engine 12 and may also include other components (not shown) of the vehicle 10. As part of the operating mode control system 20, the ECU 16 performs the necessary calculations required to determine the timing and sequencing for shifting the vehicle operating mode. The operating mode control system 20 determines when the vehicle engine 12 should be turned off, allowing the vehicle 10 to operate in electric vehicle mode. When the engine 12 is off, and the vehicle 10 is in electric vehicle mode, the transmission 14 is operated in a first operating mode. The operating mode of the transmission 14 determines when the transmission 14 should perform tasks, such as charging the motor/generator 18, shifting gears, and determine which gear ratios are used. When the engine 12 is on, the vehicle 10 is operating in standard vehicle mode. In the standard vehicle mode the transmission 14 may assist the engine 12 in driving the vehicle 10. That is, in the standard vehicle mode the vehicle 10 is driven by the engine 12 alone or by the engine 12 and the transmission 14 together. When the vehicle 10 is in standard vehicle mode the transmission 14 is operated in a second operating mode. The ECU 16 still commands the transmission 14 as when to perform various tasks. However, the circumstances under which the transmission 14 performs the tasks may be different than when the transmission 14 is in the first operating mode. The ECU 16 determines if the vehicle 10 should be operating in the electric vehicle mode or standard operation mode and, thus, when the transmission 14 should be operating in the first or the second operating mode. Various factors are taken into account including, but not limited to, the vehicle speed, acceleration/deceleration and power demand on the vehicle 10. The operating mode control system 20 also includes a shift reduction control 22 to monitor and reduce the frequency of shifting operating mode of the transmission 14.

Figure 2A:
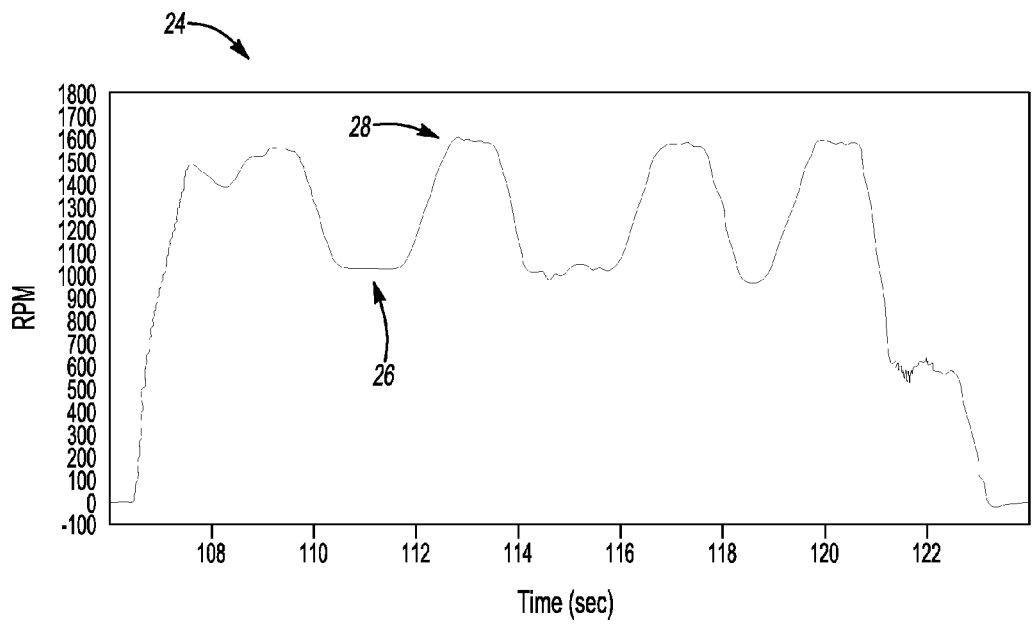
FIG. 2A is a graphic illustration of an engine speed response to operating mode shifts of the prior art.

FIG. 2A is a graph 24 illustrating an example of engine speed for a prior art vehicle operating without a system for reducing shift occurrences. The vehicle is driving at near steady state close to a threshold for switching between a first operating mode, shown at 26, and a second operating mode, shown at 28. Incremental changes of driving the vehicle 10 will cause the ECU 16 to tell the vehicle 10 to switch between the first operating mode 26 and second operating mode 28, as circumstances demand. For example, when a vehicle operator reduces throttle of the vehicle, but does not brake, this may trigger a change from the first operating mode 26 to the second operating mode 28. However, if the operator then applies a light throttle, the vehicle 10 will switch back to the second operating mode 28. Each time the vehicle switches from the first operating mode 26 to the second operating mode 28 the engine speed will flare slightly to provide a synchronous shift between the engine and the transmission, as is shown. Frequently shifting between the first operating mode 26 and the second operating mode 28 decreases fuel efficiency and causes undesirable audio and visual feedback to the vehicle operator.

Figure 2B:
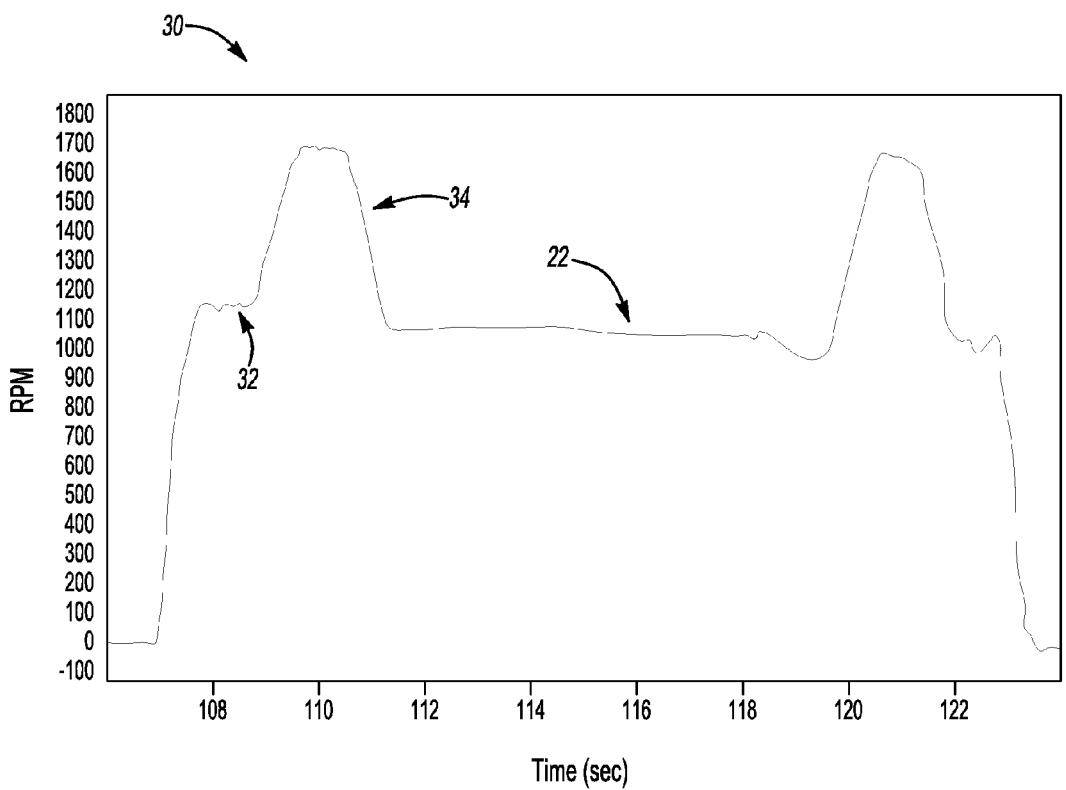
FIG. 2B is a graphic illustration of the engine speed response to operating mode shifts with the operating mode control system including the shift reduction control of FIG. 1.
Figure 3:
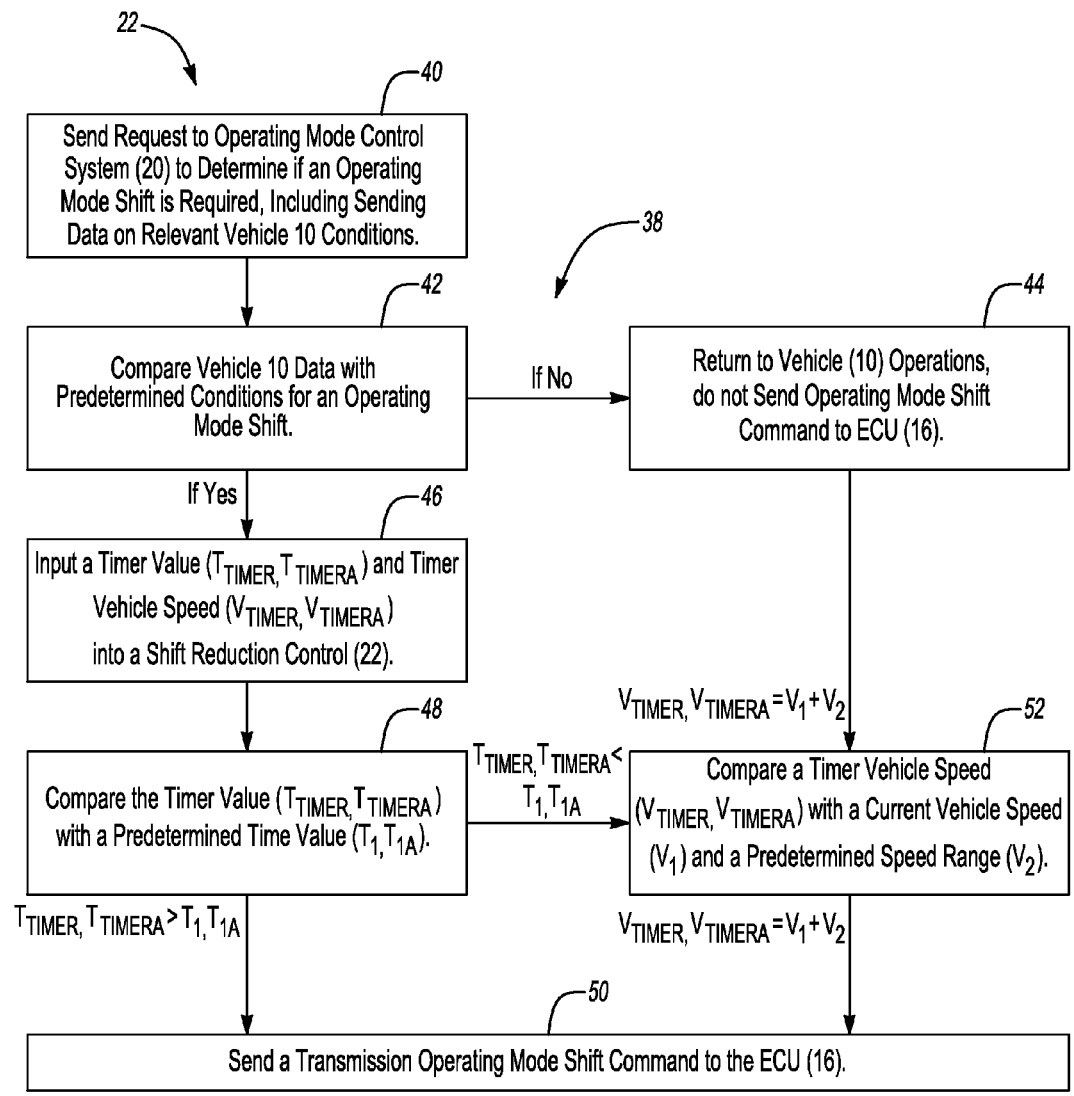
FIG. 3 is a schematic illustration of a method of utilizing the operating mode control system with the shift reduction control for the vehicle of FIG. 1.

Referring to FIGS. 2B and 3, the operating mode control system 20 with the shift reduction control 22 is discussed in further detail. FIG. 2B is a graph 30 illustrating an example of the engine 12 speed for the vehicle 10 operating with the shift reduction control 22. The vehicle 10 is driving at near steady state close to a threshold for switching the transmission 14 between a first operating mode, shown at 32, and a second operating mode, shown at 34. Incremental variations in driving the vehicle 10 will cause the ECU 16 to command the transmission 14 to switch between the first operating mode 32 and second operating mode 34, as circumstances demand. For example, when a vehicle operator reduces throttle on the vehicle 10, but does not brake, this may trigger a change from the first operating mode 32 to the second operating mode 34. However, if the operator then applies a light throttle the vehicle 10 will switch back to the first operating mode 32. The shift reduction control 22 will prevent the transmission 14 from shifting under these circumstances, as explained below.

Each time the transmission 14 switches from the first operating mode 32 to the second operating mode 34 the speed of the engine 12 will flare slightly to provide a synchronous relationship between the engine 12 and the transmission 14, i.e. to ensure the engine 12 and the transmission 14 are in synch with one another. Shifting between the first operating mode 32 and the second operating mode 34 while operating the transmission 14 near the threshold occurs less frequently, as shown, as a result of the shift reduction control 22.

FIG. 3 illustrates a method 38 for the operating mode control system 20 with the shift reduction control 22. During operation of the vehicle 10 a request, step 40, is sent to the operating mode control system 20 to determine if the transmission 14 should switch from the first operating mode, shown at 32, to the second operating mode shown at 34. The request 40 includes data from the vehicle 10 necessary for determining if an operating mode shift is required. The ECU 16 compares the data from the vehicle 10 with predetermined conditions to determine if an operating mode shift from the first operating mode 32 to the second operating mode 34 is required, step 42. If the operating mode control system 20 determines conditions are not proper for an operating mode shift from the first operating mode 32 to the second operating mode 34, then the operation mode shift of the transmission 14 is aborted and no command is given to the shift operating mode of the transmission 14, step 44. The transmission 14 continues operating in the first operating mode 26 until a new request is sent to the operating mode control system 20.

A timer is started each time an operating mode shift of the transmission 14 occurs. At the same time, a timer vehicle speed ($V_{TIMER}$) is recorded. The timer vehicle speed ($V_{TIMER}$) is the speed of the vehicle 10 when the timer began counting. The timer may also be restarted each time the operating mode shift of the transmission 14 is aborted. The timer vehicle speed ($V_{TIMER}$) is recorded every instance the timer is started, regardless of initiating circumstances.

If the ECU 16 determines conditions of the vehicle 10 may be proper for a shift in the operating mode of the transmission 14 from the first operating mode 32 to the second operating mode 34, then a timer value ($T_{TIMER}$) is recorded at that point.

The timer value ($T_{TIMER}$) and the timer vehicle speed ($V_{TIMER}$) are input into the shift reduction control 22, step 46. The shift reduction control 22 compares the timer value ($T_{TIMER}$) with a predetermined time value ($T_1$), step 48. If the timer value ($T_{TIMER}$) is greater than or equal to the predetermined time value ($T_1$) then the shift reduction control 22 determines that a shift from the first operating mode 32 to the second operating mode 34 is proper and the ECU 16 initiates a shift in the operating mode of the transmission 14, step 50. One skilled in the art would know the proper predetermined time value based upon a particular vehicle 10 and transmission 14 combination. Providing a predetermined time value ($T_1$) that must pass before the vehicle 10 switches operating modes ensures that incremental changes in the driving conditions will not result in the vehicle 10 frequently switching operating mode of the transmission 14 when unnecessary.

However, if the timer value ($T_{TIMER}$) is less than the predetermined time limit ($T_1$) a shift in operating mode may still be desirable. For example, if the timer value ($T_{TIMER}$) is less than the predetermined time value ($T_1$), but the operator of the vehicle 10 has braked or accelerated the vehicle 10 the vehicle 10 is no longer operating in steady state conditions near the threshold for an operating mode shift of the transmission 14. In this instance, an operating mode shift of the transmission 14 is desirable, in spite of the timer value ($T_{TIMER}$) being less than the predetermined time limit ($T_1$). Therefore, if the timer value ($T_{TIMER}$) is below the predetermined time limit ($T_1$) then the shift reduction control 22 obtains the current vehicle speed ($V_1$) and compares the current vehicle speed ($V_1$) with the timer vehicle speed ($V_{TIMER}$), step 52.

If the current vehicle speed ($V_1$) is within a predetermined speed range ($V_2$) of the timer vehicle speed ($V_{TIMER}$) then the shift reduction control 22 determines that an operating mode shift of the transmission 14 is not proper at the current time. The operation mode shift of the transmission 14 is aborted and no command is given to switch operating mode of the transmission 14, step 44. The timer is restarted and a new timer vehicle speed ($V_{TIMER}$) is recorded. The transmission 14 continues operating in the first operating mode 32 until a new request is sent to the operating mode control system 20.

If the current vehicle speed ($V_1$) is outside the predetermined speed range ($V_2$) then the shift reduction control 22 determines that an operating mode shift of the transmission 14 is proper and the ECU 16 initiates a shift from the first operating mode 32 to the second operating mode 34, step 50. For example, the predetermined speed range may be five miles per hour more or less than the current vehicle speed ($V_1$). One skilled in the art would know the proper predetermined speed range ($V_2$) based upon a particular vehicle 10 and transmission 14 combination.

As illustrated in FIG. 3, If a shift in the operating mode of the transmission 14 is ongoing, at step 50 and another request, step 40, is sent to return to the first operation mode 32, the shift reduction control 22 will begin again. When the shift reduction control 22 restarts as above a different timer value ($T_{TIMERA}$) and is compared with a different predetermined time limit ($T_{1A}$). This different time value ($T_{TIMERA}$) and different predetermined time limit ($T_{1A}$) are used any time the vehicle 10 is in the second operation mode 34 and is requested to go to the first operation mode 32.

While the best modes for carrying out the invention have been described in detail, those familiar with the art to which this invention relates will recognize various alternative designs and embodiments for practicing the invention within the scope of the appended claims.

The invention claimed is:

1. A method for controlling an operating mode of an electrically variable transmission for a vehicle having an internal combustion engine, comprising:
   requesting a shift in operating mode of the transmission between a first operating mode and a second operating mode, wherein in the first operating mode the engine is off and in the second operating mode the engine is on;
   determining if the shift in operating mode is desirable given vehicle conditions;
   comparing a timer value with a predetermined time value; and
   instructing a shift in the operating mode of the transmission when the timer value is greater than or equal to the predetermined time value and instructing an abort in shifting the operating mode of the transmission when the timer value is less than the predetermined time value.

2. The method of claim 1, wherein comparing the timer value with a predetermined time value further includes starting a timer when one of an operating mode shift of the transmission occurs and an abort of the operating mode shift of the transmission occurs.

3. The method of claim 2, wherein comparing the timer value with a predetermined time value further includes recording the timer value when requesting the shift in operating mode of the transmission.

4. The method of claim 1, further including:
   comparing a timer vehicle speed with a current vehicle speed; and
   instructing a shift in the operating mode of the transmission when the current vehicle speed is outside a predetermined range of the timer vehicle speed and instructing an abort in shifting the operating mode of the transmission when the current vehicle speed is within a predetermined range of the timer vehicle speed.

5. The method of claim 4, wherein comparing the timer vehicle speed with a current vehicle speed further includes starting a timer when one of an operating mode shift of the transmission occurs and an abort of the operating mode shift of the transmission occurs.

6. The method of claim 5, wherein comparing the timer vehicle speed with a current vehicle speed further includes recording the vehicle speed at the time the timer is started to obtain the timer vehicle speed.

7. The method of claim 1, further including instructing an abort in shifting the operating mode of the transmission when the current vehicle conditions indicate a transmission shift is not desirable.

8. A method for controlling an operating mode of an electrically variable transmission for a vehicle having an internal combustion engine, comprising:
   requesting a shift in operating mode of the transmission between a first operating mode and a second operating mode, wherein in the first operating mode the engine is off and in the second operating mode the engine is on;
   determining if the shift in operating mode is desirable given vehicle conditions;
   comparing a timer value with a predetermined time value;
   comparing a timer vehicle speed with a current vehicle speed; and
   instructing a shift in the operating mode of the transmission when one of the timer value is greater than or equal to the predetermined time value and the current vehicle speed is outside of a predetermined range of the timer vehicle speed.

9. The method of claim 8, further including instructing an abort in shifting the operating mode of the transmission when the timer value is less then the predetermined time value and the current vehicle speed is within the predetermined range of the timer vehicle speed.

10. The method of claim 9, wherein comparing the timer value with a predetermined time value further includes starting a timer when one of an operating mode shift of the transmission occurs and an abort of the operating mode shift occurs.

11. The method of claim 10, wherein comparing the timer vehicle speed with a current vehicle speed further includes recording the vehicle speed at the time the timer is started to obtain the timer vehicle speed.

12. The method of claim 8, wherein comparing the timer value with a predetermined time value further includes recording the timer value when requesting the shift in operating mode of the transmission.

13. The method of claim 8, further including instructing an abort in shifting the operating mode of the transmission when the vehicle conditions indicate a transmission shift is not desirable.

* * * * *